Figure 1:
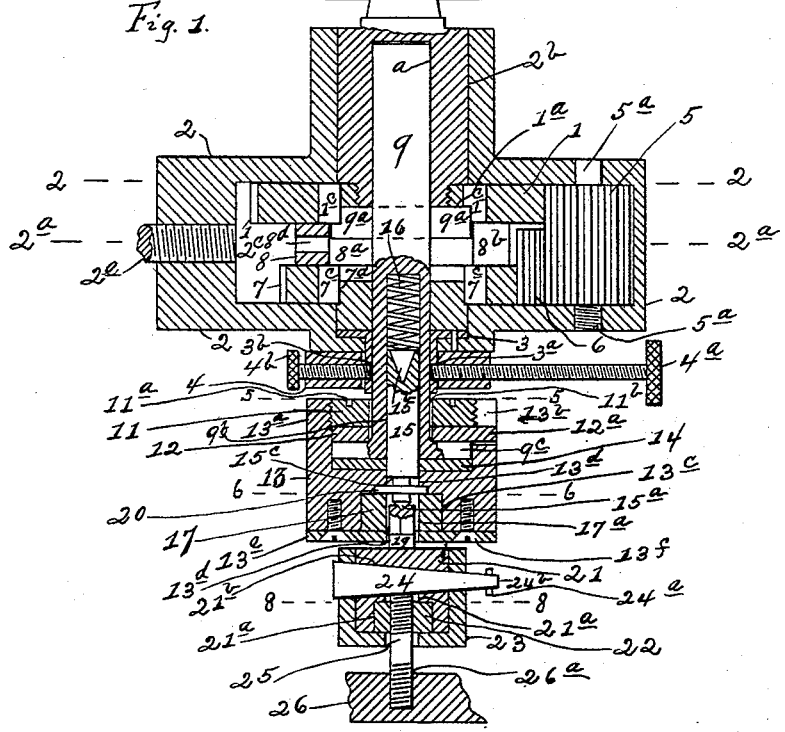

No. 632,811. Patented Sept. 12, 1899.
F. A. ERRINGTON.
STUD SETTING MACHINE.
(Application filed June 13, 1898.)

(No Model.) 2 Sheets—Sheet 1.

Witnesses
Inventor
F. A. Errington

No. 632,811. Patented Sept. 12, 1899.
F. A. ERRINGTON.
STUD SETTING MACHINE.
(Application filed June 13, 1898.)
(No Model.) 2 Sheets—Sheet 2.
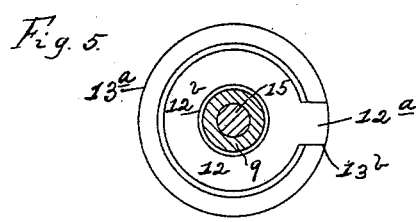
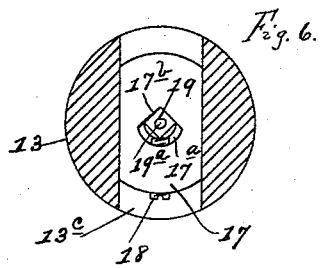
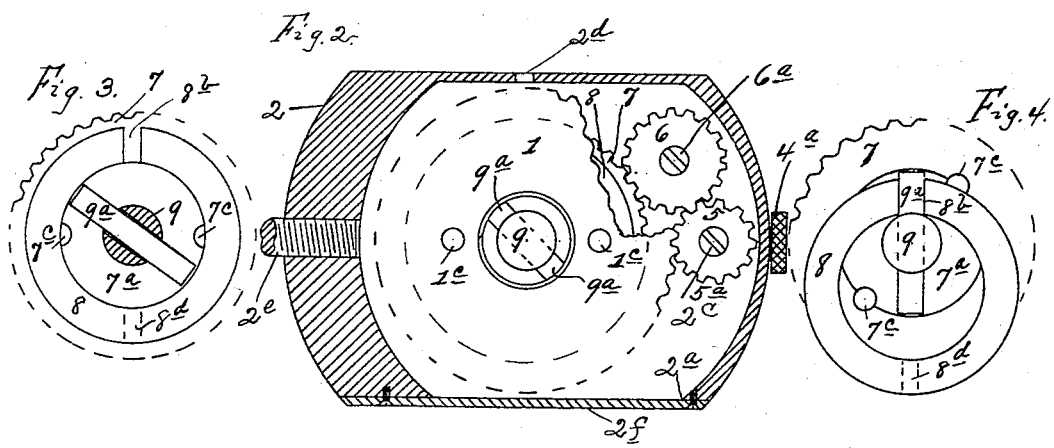
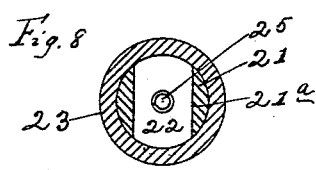
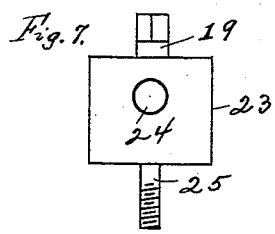
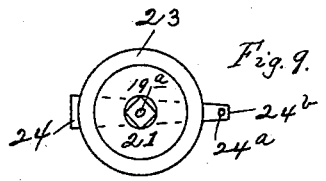
Witnesses
D. J. Wilson
Ernest H. Hutton.
Inventor
F. A. Errington

UNITED STATES PATENT OFFICE.

FRANKLIN A. ERRINGTON, OF NEW YORK, N. Y.

STUD-SETTING MACHINE.

SPECIFICATION forming part of Letters Patent No. 632,811, dated September 12, 1899.

Application filed June 13, 1898. Serial No. 683,372. (No model.)

*To all whom it may concern:*

Be it known that I, FRANKLIN ALFRED ERRINGTON, a citizen of the United States, residing in New York, (Stapleton, Staten Island,) State of New York, have invented certain new and useful Improvements in Stud-Setting Machines, of which the following is a specification.

My invention relates to means for rotating a spindle in opposite directions, to means for retaining said oppositely-rotative spindle in line with a driving part, to means for holding said spindle out of engagement with said rotative means to facilitate the connection or disconnection of a tool or holder with said spindle, to means for centering and alining said tool or holder with said spindle, to means for connecting and disconnecting a stud or similar piece to and from said spindle, and to other details of improvement and combinations of parts hereinafter described and then pointed out in the claims.

Reference is to be had to the accompanying drawings, forming part hereof, wherein—

Figure 1 is a vertical cross-sectional view of a machine embodying my invention. Fig. 2 is a plan view of Fig. 1, showing the internal mechanism looking down from line 2, the top plate and shank being removed, and the case sectioned on line $2^a$. Fig. 3 is a plan view of the reversing-wheel and thrust-ring. Fig. 4 is a view of Fig. 3, showing method of withdrawing clutch-bar. Fig. 5 is a plan view of friction mechanism, on about line 5 5 of Fig. 1, with the adjusting-nut removed to show the slip-joint that connects the check-washer with the friction-driven disk. Fig. 6 is a horizontal cross-section of Fig. 1 on the line 6 6. Fig. 7 is a front elevation of the stud-holder. Fig. 8 is a horizontal cross-section on line 8 8 of Fig. 1, and Fig. 9 is a top view of Fig. 7.

A shank A is shown as a means of connecting my device to the rotative spindle B of a drill-press D or similar tool, the parts of which being preferably arranged so that the spindle B is movable longitudinally by means of a lever C. The shank A is provided with a spindle-bearing $a$, and the lower end of said shank is reduced in diameter and threaded to mesh with a threaded bore in a gear-wheel 1, the lower end of said threaded bore being enlarged to form a clutch-chamber $1^a$ in the inner face of gear-wheel 1. A case 2 is preferably shown integral with a lateral opening $2^a$ into its gear-chamber $2^c$, through which the gear-wheel 1 is passed and then connected with a shank A by screwing the latter into the threaded bore in the outer face of said gear-wheel, the shank A passing through an axial bore $2^b$ in the top plate of case 2, the sides of said shank forming a journal for said wheel 1 in said case. The wheel 1 is provided with clutch-pins $1^c$, extending into clutch-chamber $1^a$, and the periphery of said wheel is provided with gear-teeth. The base-plate of case 2 is bored and counterbored in line with bore $2^b$ in the top plate. A non-rotative spindle-bearing is provided in the counterbore in said base-plate, preferably in the form of a bushing 3, which is suitably fastened to case 2 to prevent rotation of said bushing with relation to said case. The side walls of said bushing are pierced by opposing smooth bores $3^a$ $3^b$, and said bushing beyond said case is preferably surrounded by a stop-collar 4, preferably loosely fitted to the outside of said bushing to permit said collar to have independent lateral movement. Said collar is shown provided with two projections $4^a$ $4^b$, which are preferably shown screw-threaded and located in opposed threaded bores. The ends of said projections or stop-screws $4^a$ $4^b$ enter the transverse bores $3^a$ $3^b$.

The gear-chamber $2^c$ is preferably made eccentric to the periphery of case 2 to provide a thick wall at one side of the case to receive a reverse-rod $2^e$ and reduce the wall at the other side to provide sufficient space to receive a transmitting-pinion 5 and a reversing-pinion 6, said pinions being journaled on studs $5^a$ $6^a$, each of said studs being supported in the opposed top and base plates of case 2 and meshing with each other, the double-depth transmitting-pinion 5 also meshing with wheel 1. (See Fig. 2.) A reversing-wheel 7 is shown provided with a hub that fits into the counterbore in the base-plate of case 2, and said wheel is provided with an axial bore that registers with the non-rotative spindle-bearing in bushing 3 and with the spindle-bearing $a$ in shank A. The inner face of wheel 7 is provided with a clutch-chamber $7^a$ and clutch-pins $7^c$ in a similar manner to the arrangement of the clutches, &c., of wheel 1. The periphery of wheel 7 is also provided with gear-teeth that mesh with those of the reversing-pinion 6. By this method of gearing the wheel 7 is rotated in the opposite direction to wheel 1 through the medium of pinions 5 6. A thrust-ring 8 is interposed between the inner faces of wheels 1 and 7, said ring having a bore $8^a$, that registers with and is about the same size as the clutch-chambers $1^a$ $7^a$. One of the sides of ring 8 is preferably split to form an aperture $8^b$, and opposite said split I have shown the side wall pierced by a bore $8^d$. The side wall of case 2 is also provided with a bore $2^d$, that will register with bore $8^d$. A spindle 9 is passed up through the bushing 3, through the wheels 7 1, and journaled in bearing $a$ in shank A. Said spindle is pierced by a transverse bore to receive a clutch-bar $9^a$. Ring 8 is preferably composed of an elastic material that will enable the aperture $8^b$ to be of less diameter normally than the diameter of clutch-bar $9^a$, so that after said ring has been expanded sufficiently to allow the clutch-bar to be thrust through the transverse bore in spindle 9 the aperture $8^b$ will close to its normal size. The clutch-bar $9^a$ is of such size as to move freely in the clutch-chambers $1^a$ $7^a$, and the axial bore $8^a$ of ring 8 and its ends will hold said ring concentric with spindle 9. The height of said clutch-bar is such that it will project into said ring-bore when in full engagement with the clutches of either wheel and will miss the clutches of both wheels when midway between them. To remove clutch-bar $9^a$, the ring 8 at aperture $8^b$ is expanded and slipped over the end of the clutch-bar $9^a$, (see Fig. 4,) whereupon any preferred form of driving-pin may be inserted through the side of case 2 at hole $2^d$ and through hole $8^d$ and the clutch-bar $9^a$ driven out of spindle 9, when all the above-mentioned parts can be removed from case 2, as it is seen that the clutch-bar must first be removed before any of the other parts can be withdrawn, and for this reason the thrust-ring 8 must be provided with an aperture to permit the withdrawal of clutch-bar $9^a$ when the case 2 is integral, as shown. This thrust-ring is preferably made of fiber and retains the wheels 1 and 7 in their proper position, the construction shown being preferable to any previously-known case, as in the integral case thus made possible the bearings $2^b$ and the non-rotative spindle-bearing in bushing 3 are perfectly rigid. The "trappy" and inaccurate alinement of previous methods of construction have gone far to condemn attachable reverse mechanisms in the past, and the integral case will fully overcome this defect in function, particularly when in combination with the arrangement of gearing shown in the drawings. Before setting the stud the same machine is required to drill and then tap the hole, and the essential rigidity to perform this work is thus obtained. The lateral opening $2^a$ is closed by a plate $2^f$, which is held in place by screws, as shown in Fig. 2. It is essential to inclose gearing of this nature, as otherwise it is soon destroyed.

The outer end of spindle 9 is provided with a friction driving-disk $9^c$ and an axial bore $9^b$. Around the spindle 9, between the case 2 and the disk $9^c$, I interpose a screw-threaded adjusting ring or nut 11, having an opening $11^b$ and provided with means $11^a$ for connection with a wrench. (See Fig. 1.) Between ring 11 and disk $9^c$ I interpose a check-nut or washer 12, having a similar bore or opening $12^b$ and provided with a lug $12^a$ upon its periphery, that projects beyond the periphery of adjusting-ring 11. A friction-driven body 13 is located on the opposite side of disk $9^c$ to that upon which the ring 11 is placed, and said body 13 is provided with a screw-threaded bore, the side wall $13^a$ of which is shown internally threaded to mesh with the threads of ring 11 and provided with a slot $13^b$ to receive lug $12^a$ and of sufficient length or depth to connect said friction-disks 12 13, together to rotate in unison by a slip-joint that permits of their moving independently to and from each other, and thereby prevents the slipping of disk $9^c$ between disks 12 13 affecting the tension of the frictional contact of said disks $9^c$ 12 13. A friction-washer 14 is preferably interposed between the disks $9^c$ 13, said washer 14 being provided with an axial bore that registers with and is preferably of the same diameter as spindle-bore $9^b$. This arrangement by which the two friction-driven disks 12 13 are connected to rotate together and to carry with them the adjusting-ring 11 permits said adjusting-ring to cease to rotate under excessive strain and thereby to enable the adjustment of the tension to be made without stopping the rotation of the spindle 9 and its disk $9^c$. The body 13 is provided with an axial bore or socket $13^d$, in the inner portion of which is placed a relatively longitudinally movable center piece 15, which is shown extending up into the axial bore of spindle 9 and actuated by a spring 16. Actuating the center piece 15 by a spring is preferable to any unyielding adjustment, as it permits the tool or shank 19 to conform to any slight deviation that might occur in the alinement of the work and spindle 9. As tool-driving means the body 13 is preferably provided with a transverse bore $13^c$, in which is placed a transversely-movable socket-piece 17, provided with a socket $17^a$, having one of its sides preferably cut at an angle $17^b$ to aline and its opposite side wall provided with an adjustable clamp or screw 18 to grip a tool or tool-holder 19. (See Fig. 6.) I have preferably formed the bottom wall of the transverse bore $13^c$ of body 13 by attaching a face-plate $13^e$ by screws $13^f$. The axial bore $13^d$ is continued through said face-plate $13^e$ and is sufficiently enlarged to admit the largest tool intended to be driven by said body 13.

The alining-socket 17ª being preferably of larger diameter than the diameter of the center piece 15, I provide an abutment in the side wall of socket 13ᵈ, preferably in the form of a center washer 20, preferably placed in a recess cut in the side walls of axial bore 13ᵈ and the top wall of transverse bore 13ᶜ, said washer 20 being of greater diameter than the alining-socket 17ª to prevent its falling therethrough and provided with an axial bore that registers with the axial bore 13ᵈ and is of less diameter than the extreme diameter of center piece 15. The center piece 15 is shown provided with a convex center at one end 15ª to pass a distance through the axial bore of washer 20, limited by shoulder 15ᶜ to mesh with center hole 19ª of a tool or holder 19, held in socket-piece 17. (See Fig. 1.) Should said tool or holder 19 have no center hole 19ª or be pointed, the socket-piece 17 is slipped out of the transverse bore 13ᶜ, the center washer 20 is removed, and the center piece 15 turned end for end to expose a concave center or taper socket 15ᵇ, provided in the other end of center piece 15. The washer 20 is then replaced in its recess and the socket-piece 17 in the transverse bore 13ᶜ to hold said washer in place, whereupon the end of a tool or holder, as above described, can be centered in the axial bore of washer 20 if pointed or in the concave center 15ᵇ if small enough to pass through the axial bore of washer 20.

A stud holder or setter is provided with a body 21 and a shank 19 to connect said body with socket-piece 17 and through its connections with spindle 9, the stud-holder 21 being brought in axial alinement and held eccentrically therewith by means of the center piece 15 engaging the center hole of shank 19, as above described. Said body 21 is provided with an axial bore 21ª, opening into a transverse bore 21ᵇ. The lower portion of axial bore 21ª is enlarged and provided with parallel walls on two sides to receive a stud-nut 22, pierced by a screw-threaded axial bore. To hold said stud-nut in the enlarged portion of bore 21ª, I inclose the body 21 in a cup-shaped cover 23, having an axial bore registering with bore 21ª and transverse bores registering with bore 21ᵇ. The bore 21ᵇ is preferably tapered throughout its length through cover 23 and body 21, and to provide a suitable slip-surface above stud-nut 22 I drive a tapered pin 24 into said tapered bore 21ᵇ and prevent said tapered pin or wedge 24 from being driven out of bore 21ᵇ by a transverse pin 24ª. A stud 25 is screwed through stud-nut 22 and abuts against wedge 24 and is driven rigidly with body 21, the stud-nut 22 being provided with parallel sides fitting closely between the parallel walls of the lower portion of bore 21ª to prevent stud-nut 22 rotating independently of body 21 and the ends of stud-nut 22, being fitted between the walls of the cover 23, to register the screw-threaded bore of said stud-nut with the bore 21ª.

A hole being drilled and then tapped in work 26, the operation of the parts in setting the stud, &c., is as follows: The spindle B being rotated to the right, the spindle 9 will be rotated to the left when running idly, as the cross-bar 9ª will be resting upon the face of the clutch-chamber 7ª. (See Fig. 3.) Upon depressing my device—say by means of lever C—the stud 25 will engage the work 26 and my device will continue to descend along the spindle 9 until the clutch-bar 9ª engages the clutch-pins 1ᶜ, whereupon the spindle 9 will be rotated to the right or in the working direction. The tension of the friction-disks 9ᶜ 12 13 is adjusted (by turning the ring 11) sufficiently to screw the stud 25 into the hole 26ª until the end of said stud firmly engages the bottom of said hole; but said adjustment is so regulated as to allow for the disk 9ᶜ to slip between the disks 12 13 before the strain is sufficient to endanger breaking the stud or any part of the device, and by my construction said adjustment can be made while the spindle 9 is running. Should said adjustment not be sufficiently tight to properly seat the stud 25 in hole 26ª, the disk 9ᶜ will slip and permit the adjusting mechanism to stand still, whereupon a wrench can be applied to adjusting-nut 11 and said nut turned sufficiently to start the body 13 to rotating again. Thus in setting the first stud of a series the proper adjustment can be secured for setting the balance of the same-sized studs. The stud 25 being thus firmly seated, the lever C is thereupon raised sufficiently to withdraw the clutch-bar 9ª from the clutch-pins 1ᶜ, the slip pin or wedge 24 is struck on its end 24ᵇ to release the tension of the meshing threads of nut 22 and stud 25, whereupon the lever C is further raised, the clutch-bar 9ª brought into engagement with the clutch-pins 7ᶜ, and the nut 22 thereby unscrewed, leaving the stud 25 fixed in work 26.

In order to disengage the tool or holder 19 21 from the spindle 9, I stop the rotation of spindle 9 by bringing the clutch-bar 9ª on the dead-center, (out of engagement with both the driving-clutches 1ᶜ and the reversing-clutches 7ᶜ,) say, by slipping a piece of tin over the axial bore 21ª (to prevent the stud reëntering therein) and lowering the lever C until the clutch-bar 9ª is raised out of engagement with clutch-pins 7ᶜ, whereupon I turn one of the stop-screws 4ª, and thereby cause both of the stop-screws 4ª 4ᵇ to engage the spindle 9, as it will be seen that the independent lateral movement of collar 4 permits the stop-screws 4ª 4ᵇ to press with equal force against spindle 9, and thus avoid deflecting said spindle from its normal position in its bearings and still holds said spindle from longitudinal movement in the non-rotative spindle-bearing in bushing 3. The spindle 9 being now out of rotary engagement with spindle B, I am enabled to slack the clamping-screw 18, which releases shank 19 and separates the stud-holder from spindle 9. A drill, tap, or any desired tool can now be placed in socket 17ª, gripped by screw 18, and stop-screw 4ª slacked back, whereupon the clutch-bar 9ª will drop into the reversing position by gravity and the device will be ready to operate, as above described.

Having now described my invention, what I claim is—

1. The combination of a case, a driving-wheel and a reversing-wheel, the axes of said wheels being in line, each of said wheels being provided with a clutch, a thrust-ring interposed between the inner faces of said wheels, a spindle having a clutch rotatable independently of said thrust-ring and adapted to engage either of said wheel-clutches, and gearing carried by said case and adapted to rotate one of said wheels in the opposite direction to the other thereof, substantially as described.

2. The combination with a case having integral top, base and side plates and provided with a lateral opening into its gear-chamber, of a driving-wheel adapted to pass said opening and suitably journaled in the top plate of said case, a reversing-wheel journaled in line with said driving-wheel, each of said wheels being provided with a clutch, a spindle journaled axially of said wheels and having a transverse bore, a clutch-bar located in said spindle-bore and adapted to engage either of said wheel-clutches, a thrust-ring interposed between the inner faces of said wheels and provided with means to permit said clutch-bar to be removed from said spindle-bore without disturbing the relative positions of said driving and reversing wheels, and gearing carried by said case and adapted to rotate one of said wheels in the opposite direction to the other thereof, substantially as described.

3. The combination with a case having integral top, base and side plates and provided with an opening into its gear-chamber, of a driving-wheel adapted to pass said opening and suitably journaled in the top plate of said case, a reversing-wheel journaled in line with said driving-wheel, each of said wheels being provided with a clutch, a spindle journaled axially of said wheels and provided with a clutch adapted to engage either of said wheel-clutches, and gearing carried by said case and adapted to rotate one of said wheels in the opposite direction to the other thereof, substantially as described.

4. The combination with a case having integral top, base and side plates and provided with an opening into its gear-chamber, said gear-chamber being eccentric to the periphery of said case to provide at one side thereof a thick wall to receive a reverse-rod, of a driving-wheel adapted to pass said opening and suitably journaled in said top plate, a reversing-wheel journaled in line with said driving-wheel, each of said wheels being provided with a clutch, a spindle having a clutch or clutches adapted to engage either of said wheel-clutches, and gearing carried by said case and adapted to rotate one of said wheels in the opposite direction to the other thereof, substantially as described.

5. The combination with a case having integral top, base and side plates and provided with an opening into its gear-chamber, said gear-chamber being eccentric to the periphery of said case to provide at one side thereof a thick wall to receive a reverse-rod and at the other side thereof a space to receive a transmitting-pinion and a reversing-pinion that mesh with each other and are suitably journaled in said case, of a driving-wheel adapted to pass said opening and suitably journaled in said top plate and meshing with said transmitting-pinion, a reversing-wheel journaled in line with said driving-wheel and meshing with said reversing-pinion, each of said wheels being provided with a clutch, and a spindle having a clutch adapted to engage either of said wheel-clutches, substantially as described.

6. The combination with a case having integral top, base and side plates and provided with an opening into its gear-chamber, of a driving-wheel adapted to pass said opening and suitably journaled in the top plate of said case, a reversing-wheel journaled in line with said driving-wheel, each of said wheels being provided with a clutch, a spindle having a clutch adapted to engage either of said wheel-clutches, a reversing-pinion meshing with said reversing-wheels, and a transmitting-pinion meshing with said driving-wheel and with said reversing-pinion, each of the axles of said pinions being supported in both the top and the base plates of said case, substantially as described.

7. The combination with a frame having a non-rotative spindle-bearing provided with a transverse bore or bores opening thereinto, two wheels, each of said wheels being provided with a clutch, a spindle movable longitudinally relative to said non-rotative spindle-bearing and provided with a clutch or clutches adapted to engage either of said wheel-clutches or to be out of engagement with both thereof, a projection or projections that mesh with said transverse bore or bores of said non-rotative spindle-bearing, and means to actuate said projection or projections to hold said spindle clutch or clutches out of engagement with said wheel-clutches, substantially as described.

8. The combination with a frame having a non-rotative spindle-bearing provided with a transverse bore or bores opening thereinto, two wheels, each of said wheels being provided with a clutch, a spindle movable longitudinally relative to said non-rotative spindle-bearing and provided with a clutch or clutches adapted to engage either of said wheel-clutches and to be out of engagement with both thereof, and an independently-movable stop-collar carrying a projection or projections that mesh with said transverse bore or bores of said non-rotative spindle-bearing, and means to actuate said projection or projections, substantially as described.

9. The combination of a body having a socket to receive a tool and being provided with means to connect said tool to rotate in unison with said body, of a relatively longitudinally movable reversible center piece having one of its ends provided with a convex center and the other end indented by a concave center, substantially as described.

10. The combination of a body having a socket to receive a tool and being provided with tool-driving means to connect said tool to rotate in unison with said body, of a center piece having a tapered center to mesh with said tool, a spring adapted to move said center piece outwardly along said socket, and means independent of said tool-driving means to limit the outward longitudinal movement of said center piece, substantially as described.

11. The combination with a body having a socket adapted to receive a tool, tool-driving means to connect said tool to rotate in unison with said body, of a center piece located in the inner portion of said socket and having a tapered center to mesh with said tool, a spring adapted to move said center piece outwardly along said socket, and an abutment provided in the side wall of said socket independent of said tool-driving means to limit the outward longitudinal movement of said center piece, substantially as described.

12. The combination with a body having an axial bore to receive a tool and a transverse bore opening into said axial bore, of a relatively longitudinally movable center piece situated in the inner portion of said axial bore, a relatively transversely movable socket-piece having a socket and being located in said transverse bore, and a center washer located between the inner surface of said socket-piece and said body and provided with a bore that registers with said axial bore and that is of smaller diameter than the extreme diameter of said center piece, the diameter of said washer being greater than the smallest diameter of said socket in said socket-piece, substantially as described.

13. The combination with a driving friction-disk, a friction-driven body having an axial bore adapted to receive a tool, tool-driving means to connect said tool to said body to rotate in unison therewith, means independent of said tool-driving means to adjust the tension of the frictional contact of said disk and body, and means to preserve said tension at the degree adjusted, of a center piece longitudinally movable independently of said tool-driving means and provided with a tapered center adapted to mesh with said tool, and means independent of the outward tool-driving means to limit said longitudinal movement of said center piece, substantially as described.

14. The combination with a driving friction-disk, a screw-threaded adjusting-nut, a check-washer interposed between said disk and nut, said nut and washer being each provided with an opening to admit means to connect said disk with a rotative driving part, a friction-driven body having one of its ends provided with a screw-threaded bore to mesh with said nut, said body and said check-washer being connected together to rotate in unison by a slip-joint that permits them to move independently toward and from said disk, said body being also provided with an axial bore to receive a tool, tool-driving means to connect said tool to said body to rotate in unison therewith, of a center piece longitudinally movable independently of said tool-driving means and provided with a tapered center adapted to mesh with said tool, and means independent of said tool-driving means to limit the outward longitudinal movement of said center piece, substantially as described.

15. The combination with a body having an axial bore provided with screw-threads to mesh with a stud and also having a transverse bore opening into said axial bore, of a wedge located in said transverse bore and having its surface exposed within said axial bore to enable said wedge to directly engage said stud, substantially as described.

16. The combination with a body having an axial bore and a transverse bore opening into said axial bore, and a nut suitably held from independent rotation within said axial bore and internally screw-threaded to mesh with a stud, of a wedge located in said transverse bore and having an exposed surface opposed to said nut to enable said wedge to directly engage said stud, substantially as described.

17. The combination of a body having an axial bore and a transverse bore opening into said axial bore, a cover having an axial bore and a transverse bore that register respectively with the corresponding bores in said body, one of said parts having its axial bore provided with screw-threads to mesh with a stud, and a wedge located in said transverse bores to connect said cover with said body, said wedge having its surface exposed to enable said wedge to directly engage said stud, substantially as described.

18. The combination of a body having an axial recess, an internally-screw-threaded stud-nut located in said recess and connected to rotate with said body, a cover having a bore that opens into said recess and side walls that extend along said body, said body and cover having a transverse bore that extends through both and communicates with said axial recess of said body, and a wedge transversely movable in said transverse bore, substantially as described.

F. A. ERRINGTON.

Witnesses:
 ERNEST H. HUTTON,
 D. J. WILSON.